United States Patent Office 3,386,418
Patented June 4, 1968

3,386,418
PROCESS FOR FEEDING DOMESTIC ANIMALS, ESPECIALLY PIGS
Heinrich Biehl, Witzhave, near Trittau, Germany
No Drawing. Filed Mar. 16, 1966, Ser. No. 534,676
Claims priority, application Germany, Oct. 23, 1965, B 84,226
5 Claims. (Cl. 119—51)

ABSTRACT OF THE DISCLOSURE

A method for the feeding of animals to increase the efficiency of the conversion of feed to usable animal weight whereby the animals' digestive processes are stimulated by regulating the duration and number of daily feedings such that the animals' appetites are not satiated. The practice of the invention permits feeds having higher nutrient value than previously employed to be utilized with advantageous results, particularly with respect to protein content.

---

In the field of animal nutrition considerable advancement of knowledge has been achieved during the past 20 years. The object has been the reduction of the quantity of food-stuffs required to obtain a given output performance. Output performance is meant to include increase in weight, production of milk and eggs and reproduction.

Originally animal raisers were only concerned with varying the composition of foodstuffs by regulating the ratio of the nutrient ingredients to each other. In the course of time it was acknowledged that the quality of the nutrients used for feeding was of significance in improving the output performance.

It also became clear that there were differences between the efficiency of protein of animal origin and protein of vegetable origin. In particular, it has been found that two chemically identical food mixtures will bring about very different results if the protein in one is of animal origin, e.g. fish meal, and in the other is of vegetable origin, e.g. soy bean extract. In accordance with this the efficiency of the protein contents can be very different, even when, chemically speaking, they are identical. The contents are determined by Weende's analysis, the nitrogen content ascertained being multiplied by 6.25. Research into the reasons for the differing efficiencies has led to the conclusion that different amino acids of the same chemical compositions and the presence of definite or indefinite factors is the cause.

In the course of time many substances have been discovered which as accompanying substances can determine not only the efficiency of the protein but also that of the carbohydrates and even of the fat. Some of these substances are, inter alia, vitamins, trace elements and antibiotics. All the substances mentioned occur in the nature.

By adding the effective substances mentioned, which are also frequently called supplementary substances, it is nowadays possible to improve the nutrition of our domestic animals and thus improve their output performance. In pig-rearing it is nowadays possible to attain a given weight with 70 to 80% of the expenditure on foodstuffs required about 15 years ago. This improved efficiency has been attained by the use of a foodstuff of optimum composition both of the proteins and of the balance of the foodstuffs by the standards of the animals' requirements and the animals' output performance.

About 15 years ago in pig-fattening the expenditure of 450 kg. of mixed cereal food to produce 100 kg. of live weight was considered a good average achievement. By comparison an expenditure of about 330 kg. is reckoned, a good average performance nowadays.

In rearing animals the expenditure on foodstuffs still constitutes by far the largest proportion of the total expenditure even though considerable progress has been made in reduction of this expense. It is therefore obvious that reduction of expenditure on foodstuffs continues to be the object.

Unfortunately the prospects of discovering in the future other substances which will further improve output performance when used to supplement present foodstuffs are comparatively slender.

To date little is known about the action of vitamins, trace elements, antibiotics and also amino acids. It is, however, reasonable to assume that all substances present in the foodstuffs influence the digestion directly or indirectly.

In the search for new materials which would improve food conversion, hormones and stimulants, such as surface-active substances have been investigated. The addition, too, of medicaments or of non-physiological substances comparable to medicaments has been tested and, indeed, already applied in some branches of animal husbandry.

The present invention is based on the idea that the output performance may be improved by mobilizing substances within the body rather than by adding foreign materials. One may start from the point that generally only about 30 to 40% of the food taken in is employed for the animal's output performance. The remaining food is used by the animal's energy system.

Oslage ("Investigations Into the Physical Composition and Accretion of Materials of Growing Pigs" in the periodical "Zeitschrift für Tierphysiologie, Tierernährung und Futtermittelkunde" of December 1964) volume 19, Number 6, pages 330 to 357, especially Table A/1, found that pigs' bodies with an average live weight of 110.3 kg. contain only 51.92% of dry substance.

According to Schmidt-Kliesch-Görtler's manual "Lehrbuch der Schweinezucht," 2nd Edition, 1945, page 64, the content of nutriment in sides of pork per 100 kg. live weight in the breed called Improved Country Pig (Veredelte Landschweine) is composed of:

|  | Kg. |
|---|---|
| Water | 45.32 |
| Dry substance | 54.68 |
| Protein | 13.04 |
| Fat | 38.91 |
| Ash | 2.73 |

|  | Calories |
|---|---|
| The production of 13.04 kg. of protein corresponds to a value of | 53,464 |
| And the production of 38.91 kg. of fat corresponds to the production of | 373,536 |
|  | 427,000 |

330 kg. of mixed cereal feed with a dry mass content of 85% is required to produce a live weight of 100 kg., said 85% dry mass content comprising:

|  | Percent |
|---|---|
| Digestible protein | 16.2 |
| Nitrogen-free extracts | 63.0 |
| Digestible fat | 4.6 |

This means that food with a value of 1.008 million calories must be expended for the production of 427,000 calories. The person fattening pigs receives back in the form of meat and fat only about 42%, reckoned in calories, of the total calories expended. 70% of the food expended is used up in the energy system or is evacuated unused.

In detail, the value of 1.008 million calories may be explained as follows:

|   | Calories |
|---|---|
| 330 kg. of mixed cereal feed with an 85% dry mass corresponds to 280.5 kg. dry mass 18% of crude protein=16.2 of digestible protein yield a total of 45.441 kg. of digestible protein, or | 186,308.1 |
| 70% of nitrogen-free extracts with a digestive value of 90% yield 280.5×63=176,715 gr. of nitrogen-free extracts, or | 724,531.5 |
| 4.6% fat with a digestive value of 90% yield 280.5×36=10,098 gr. of fat, or | 96,940.8 |
|  | 1,007,780.4 |

This degree of efficiency of 42% for the exploitation of food by the animal is based on particularly favourable assumptions. As a rule a rate of exploitation of about 30% can be reckoned on.

The above calculations clearly show that it is of considerable economic importance to diminish the expenditure of energy required to convert food and at the same time to prevent, or at any rate at least to restrict the loss occurring through a part of the nutrients consumed being evacuated unused.

Methods for the prevention of waste of foodstuffs and diminution of the expenditure of energy in metabolism have already been described in the same applicant's German patent applications:

(1) B 59,229 IVa/53g of Nov. 3, 1960, "Fermented Feed Preparation" (corresponding U.S. Patent No. 3,172,764).
(2) B 68,667 IVa/53g of Sept. 1, 1963, "Process for Producing Fermented Feed."
(3) B 80,721 IVa/53g of Feb. 25, 1965, "Process for Producing an Exclusive Feed for Nourishing Useful Animals in Agriculture."

Fermented food is utilized by the animal better than fresh food. A saving in energy is obtained in that the animal is relieved of a part of its digestive activity by the fermentation of the foodstuff beforehand. Experiments that were carried out as a basis for the patent applications mentioned show that the loss of nutriment caused by the fermentation is less than the saving in food that results when one makes a comparison with those amounts of food that are required to obtain the same output performance when fresh food is issued. This saving in food is explained by the fact that when fresh food is issued, in contrast to fermented food, all the digestive processes are left to the animal.

There are only two real prospects for improvement of the animal's output performance by reduction of foodstuff expenditure. One possibility, with which the abovementioned patent applications deal, is that part of the conversion of the foodstuffs can be affected before the food is issued to the animal in a manner that is more rational than the one effected by the animal's digestion. The other possibility is that of directly influencing the animal's digestion. The influence of foodstuff additives is limited in more than one way. Furthermore the possibility of doing damage both to the human beings employing animal products as food cannot be excluded so long as the effective mechanism of the supplementary substances hitherto employed in foodstuffs is not understood.

The improvements in output performance achieved by adding various substances to the food may be due to effects favourable to the intestinal flora formed by bacteria and to fermentation and hormone production as regards both the types and the quantities involved.

The present invention is aimed at favourably influencing the conversion of substances within the animal's body, the digestion being improved without recourse to food additives. An object of the invention is an improved utilization of food obtained by stimulating the animal's digestion. Both the type and quantity of those substances within the body which participate in utilizing the food are favourably influenced by the use of this method.

The reference to substances within the body which participate in utilizing the food means digestive juices and hormones as well as micro-organisms present in the animal's body.

According to the invention there is a method for feeding domestic animals, wherein the total feeding time for the animals each day amounts to at most 75% of the time that is usually required for rationed feeding of such animals and wherein this total feeding time is divided into at least six individual feeds distributed over the period between morning and evening, the durations of the individual feeds being of approximately equal length, as also the intervals between them. This method has been developed with pigs in mind but is also suitable for cattle (ruminants), sheep, goats and poultry.

The feeding of domestic animals is associated with a considerable expenditure of labour. For that reason, in recent years many feeding devices have been developed and marketed. They are intended to ease the labour of the animal-rearer. In order to bring out the peculiarity of the present invention the rationing of food often customary in feeding pigs is compared with automatic feeding in the ensuing section.

In rationed feeding the animals are issued with a certain amount of a given foodstuff two or three times a day. In the case of three meals a day the amount is so adjusted, for instance with pigs, that the feeding trough gets completely emptied in 12 to 14 minutes. The total feeding period accordingly amounts to 36–42 minutes, an average therefore of 40 minutes a day for pigs, if these are fed conventionally by ration thrice daily. This total feeding period, on the assumption that rationed feeding in shed or stye is practised, varies with the individual species of animal involved, and with cattle is, for instance, considerably longer.

The dry food is generally mixed with water so that it forms a thick mash. Either before or after feeding, the animals are additionally given water to drink. The example of pig-rearing given above in which 330 kg. of mixed cereal feed are required to produce a live weight of 100 kg, was based on the employment of rationed feeding.

In automatic feeding the animals are given free access to the feed automats. Just as in rationed feeding, the feed can be of certain composition regulated to the animals' needs. It is, however, dry, and the liquids required have to be provided separately from the feed.

In automatic feeding food utilization is poorer than in rationed feeding and pigs which have been automatically fed are found to have more fat than usual when slaughtered. The poorer food utilization and the high fat content of the carcases lead one to conclude that the protein in the feed was converted into fat instead of into meat. The animals' digestion obviously functions less well on automatic feeding than on rationed feeding.

That rationed feeding leads to better results than does automatic feeding is ascribable, inter alia, to the following circumstances, especially as regards pigs. Feed in thick mash form can be better salivated by the pigs. Thus the first digestive process is immediately favourably influenced. Also feeding takes place at set times of the day, and thus a stimulating effect is straightaway obtained. An unnecessary expenditure of energy through feeding for too long is avoided by issuing the feed in strict portions.

A preferred use of the method according to the invention involves adjustment of the duration of the individual feeds so that the food is withdrawn from the animal before it reaches satiation.

It is recommended that the total feeding time per day should be not greater than 18 minutes, preferably 13.5, and this total feeding time should be divided into 9 individual feeds each of not greater than 2 minutes (preferably 1.5 minutes) when this method is employed to fatten pigs with a live weight of not less than 5 kg. until they are ready for slaughter.

The recommended feeding times are even more effective if used in combination with the refinement described above of ensuring that there is a surplus remaining at the end of each feed and withdrawing this surplus suddenly. In this manner the substances within the body of the animal are particularly strongly stimulated.

The invention is further improved by indicating the commencement or termination of the individual feeding periods to the animal by acoustic, optical, electrical or mechanical signals.

Stimulation thus occurs when this method is used in the preferred manner by raising the frequency of the feeds while observing set times, by shortening the period of each meal and by ending the meal before the animal has emptied the feeding trough. The measures described result in comparable quantities of food being consumed in smaller portions.

Since feeding always takes place at the same time and for the same period, the working of the whole digestive system is improved, the substances within the body are more prepared, the quality of these substances is improved and their quantity increased. The result is that the food is homogeneously mixed with the enzymes, hormones and micro-organisms required for digestion, the digestive activity is intensified, the expenditure of energy required for digestion is diminished and the wastage of nutrients is lowered.

Among the measures mentioned that influence the digestion particular importance can be ascribed to the withdrawal of the trough at the end of the period when there is still food remaining in it. Comparative experiments have shown that the withdrawal of food influences output performance particularly favourably.

In a feeding experiment, three groups each of 100 pigs were compared. The initial weight of all the animals was approximately equal.

Group A: rationed feeding thrice daily,
Group B: rationed feeding nine times daily,
Group S: rationed feeding nine times daily with withdrawal of the food.

In Group C the duration of the feeding time for the individual feeds was the same as in Group B but so arranged that at the end of each eating period there was still food in the trough, and this was then withdrawn from the animal.

The periods for eating comprised:
Group A: 3×13 minutes=39 minutes daily.
Group B: 9×90 seconds=13.5 minutes daily.
Group C: 9×90 seconds=13.5 minutes daily (with food withdrawn at the end of the feeding period).

|  | No. of animals | Initial weight in kg. | Final weight in kg. | Av. daily increase in gr. | Days fattened | Av. total feed exp. in kg. |
| --- | --- | --- | --- | --- | --- | --- |
| Group A | 1 100/98 | 25.2 | 120.362 | 638 | 149 | 361.8 |
| Group B | 1 100/98 | 25.4 | 120.562 | 690 | 138 | 340.7 |
| Group C | 100 | 25.1 | 120.200 | 819 | 116 | 288.9 |

1 Two animals had to be withdrawn from the test because of disease or death.

The above results of the experiment clearly demonstrate that the more frequent feeding employed in Group B of itself brought about a higher daily increase in weight. This resulted in reduction of the fattening period and a consequent decrease in the average total quantity of food consumed. The saving in foodstuffs is due to the decrease in the expenditure of energy through reducing the total time spent in attaining the final weight.

In tests on eating it was ascertained that, with rationed feeding thrice daily and an eating period of 14 minutes for one portion, the eating performance does not progress equally but falls away. If the eating period is extended a rise in the energy expenditure required for eating ensues. If a meal consists of 1 kg. of feed and the animal requires 14 minutes to consume this amount, consumption in the first two minutes is about 400 gr. and in the third minute only about 100 gr. The energy expended in eating one meal is considerably higher for the last part of the meal than the energy expended in respect of the first part of the meal.

Furthermore the observation of set times for eating is stimulating and encourages the saving of food and improvement in performance.

The progress obtained in Group C, with feeding nine times daily and a withdrawal of food, is particularly great. The stimulation of voracity through the withdrawal of food at the end of the individual eating time thus influences the body's production of those substances which are involved in digestion and the metabolism of the animal both lastingly and particularly favourably. In this respect it is also significant that only Group C had no wastage because of disease or death.

For the feeding experiments set out above the following mixtures of foodstuffs were employed, a protein concentrate of the following composition being used for all the experiments:

|  | Percent |
| --- | --- |
| Fish meal | 50.00 |
| Soy extract granules | 36.00 |
| Bone granule feed (not de-glued, fine) | 8.00 |
| Calcium carbonate feed | 3.50 |
| Aurofac 2 A supplementary mix for feed (Auromycin bound with soy extract granules) | 1.96 |
| Trace elements (Zn, Se, Mc, Co in the ratio 9.1:1, 1:0, 89:0.10) | 0.50 |
| ADERBE® vitamin concentrate (A, $D_3$, $B_1$ and $B_2$) | 0.04 |
|  | 100.00 |

In the live weight range of 25 to 40 kg. all the animals received a foodstuff mixture of the following composition:

|  | Percent |
| --- | --- |
| Maize | 45.0 |
| Barley | 35.0 |
| Protein concentrate | 15.0 |
| Wheat bran | 5.0 |
|  | 100.0 |

This mixture has the following values by analysis:

|  | Percent |
| --- | --- |
| Dry mass | 88.3 |
| Crude protein | 16.4 |
| Crude fat | 3.4 |
| N-free extracts | 60.1 |
| Crude fibres | 3.7 |
| Crude ash | 4.7 |

In the live weight range of 40 to 75 kg. all the animals received a foodstuff mixture of the following composition:

|  | Percent |
| --- | --- |
| Barley | 40.0 |
| Maize | 40.0 |
| Protein concentrate | 10.0 |
| Wheat bran | 6.5 |
| Soy extract granules | 3.0 |
| Phosphate of lime | 0.5 |
|  | 100.0 |

This mixture has the following values by analysis:

| | Percent |
|---|---|
| Dry mass | 88.2 |
| Crude protein | 16.5 |
| Crude fat | 3.1 |
| Crude fibres | 4.0 |
| N-free extracts | 60.0 |
| Crude ash | 4.6 |

From 75 to 120.5 kg. live weight all the animals received a foodstuff mixture of the following composition:

| | Percent |
|---|---|
| Barley | 42.0 |
| Maize | 40.0 |
| Protein concentrate | 8.0 |
| Wheat bran | 5.5 |
| Soy extract granules | 4.0 |
| Phosphate of lime | 0.5 |
| | 100.0 |

This mixture has the following values by analysis:

| | Percent |
|---|---|
| Dry means | 88.2 |
| Crude protein | 15.0 |
| Crude fat | 3.1 |
| Crude fibres | 4.0 |
| N-free extracts | 61.8 |
| Crude ash | 4.3 |

The method of the invention should preferably be used in conjunction with the method of the invention according to the same applicant's German patent application No. B 82,282 III/45h (corresponding U.S. Patent No. 3,359,947), "Feeding Device for Animals, More Especially Pigs."

The invention furthermore enables metabolic energy to be saved and prevents wastage of nutrients in the animal's excreta. It also enables the animal to digest nutrients which have hitherto been wasted or utilized uneconomically, and to utilize more advantageously those nutrients essential to the development of all animal products, for example protein, which are of particular value.

A further advantage obtained by the invention, is that, as a result of stimulation of substances within the body, the feed additives that raise the costs of food become partially or entirely unnecessary and also the cheaper foodstuffs, the use of which had hitherto been impossible, can now be utilized.

Finally, the invention creates the possibility of altering the nutrient ratios in the food mixture in favour of those nutrients by means of which particularly valuable animal outputs, such as meat or eggs or milk are obtained.

In pig-rearing particular value is placed on the production of meat and less value on the production of fat. According to experiences to date, an optimum conversion of protein is obtained in pig-fattening with an average protein content of 15 to 16% in the food.

If in conventional feeding processes more protein is used, the excess protein is converted into fat. The results quoted below of feeding experiments show that by employing the feeding process in accordance with the invention the prerequisite is created for the animal's ability to convert more protein in the feed and consequently for the animal to produce less fat and more meat.

Here is the result:

*Group D (100 animals)*

| | | |
|---|---|---|
| Initial weight | kg | 25.3 |
| Final weight | kg | 120.5 |
| Fattening period | days | 115 |
| Feed requirement | kg | 287.2 |
| Average daily increase | gr | 827 |

*Group E (100 animals)*

| | | |
|---|---|---|
| Initial weight | kg | 25.2 |
| Final weight | kg | 120.8 |
| Fattening period | days | 111 |
| Feed requirement | kg | 267.0 |
| Average daily increase | gr | 861 |

Both Groups D and E were fed, in accordance with the preferred method according to the invention, nine times a day, the food being withdrawn after an eating time of 90 seconds per portion.

Group D received the same food as Groups A, B, and C in the experiment first described. Group E received the same feed as Group D until it reached a live weight of 75 kg.; Group E continuously received, from 75 to 110 kg. live weight, the same feed as Groups A, B and C had when in the range of 40 to 75 kg. live weight. Thus, during the last fattening period viz. the live weight range of 75 to 120 kg., the protein content of food used for Group E was higher than that used for Group D for most of the time. Group E also had at its disposal in the fattening range of 75 to 120 kg. protein of high grade containing more animal protein, especially fish meal, than the protein used for Group D in said fattening range.

The reduction in the average total quantity of food consumed under the Group E conditions was due to full utilization of the protein content of the food in the live weight range of 75 to 110 kg. to produce meat. The protein content of the food consumed in the live weight range of 75 to 110 kg. was such that on automatic or rationed feeding (both as herein described) some of it would have been used uneconomically to produce fat.

The foregoing results correspond to the yield obtained after slaughter. After slaughter of the animals used in the above experiment, those animals in Group D had an average of 4.4 cm. of back lard, measured at the fourth vertebra on the loins. The animals in Group E had only 3.8 cm. of back lard measured at the same position.

The norms published by the German Agricultural Society, Feedstuffs and Grasslands Section, can be regarded as well know and recommended figures to cover requirements. According to these, young pigs up to a weight of 50 kg. live weight should be given a feed the minimum content in crude protein of which amounts to 18% and the maximum content in crude fibres of which amounts to 6%. Pigs with a weight of 50 to 75 kg. live weight should be given a feed the minimum content in crude protein of which amounts to 12% and the maximum content in crude fibres of which amounts to 6%. Pigs with a weight above 75 kg. live weight should be given a feed the crude protein content of which amounts to 10% and the maximum content in crude fibres of which amounts to 8%.

According to the recommendations of the National Academy of Sciences, National Research Council, pigs up to 25 lbs. live weight should receive a feed with 18% crude protein, pigs up to 50 lbs. live weight should receive a feed with 16% crude protein, pigs up to 100 lbs. live weight should receive a feed with 14% crude protein, pigs up to 150 lbs. live weight should receive a feed with 14% crude protein, pigs up to 200 lbs. live weight should receive a feed with 12% crude protein, pigs up to 250 lbs. live weight should receive a feed with 12% crude protein.

Though the figures to cover requirements as given by the two institutions do not agree, the recommendations both of the German Agricultural Society and of the National Academy of Science proceed from the point that the protein content in the feed should be reduced with increasing age and weight. The recommendations of both institutions have as their basis the experience that when more protein is issued the protein is converted into fat.

By use of the invention—as the results of above experiments demonstrate—the pre-requisites are provided in the body for more protein to be utilized and converted into meat. As 1 gr. of protein is about 2½ times as expensive as 1 gr. of starch, but in contrast produces almost 7 times as much body substance, not only is an improvement in the value of the carcass but also a decrease in the cost of feed achievable through the possibility of making more protein useful with the aid of the process in accordance with the invention.

What I claim is:

1. A method for the timed controlled feeding of domestic animals to provide improved efficiency of conversion of a feed ration into usable animal weight wherein said feed is presented to the animals for consumption during a series of given daily timed feeding intervals and removed from the animals for timed nonfeeding intervals separating said timed feeding intervals of a series comprising, daily presenting all of said feed ration that is to be fed to the animals each day during at least six spaced feeding intervals, said feeding intervals of each daily series each being of approximately equal duration of time and separated by nonfeeding intervals which are each of approximately equal duration of time, the number and duration of said feeding intervals being sufficient to present to the animals a quantity of said feed ration sufficient to increase the weight of the animals and said feeding intervals being regulated such that said nonfeeding intervals occur prior to the animals consuming all of the feed and having their appetites completely satisfied.

2. A method for the feeding of domestic animals as in claim 1 wherein the time period representing the sum of all of said feeding intervals occurring in a daily series is no greater than 75% of the time necessary for the animals to normally consume the total amount of feed to which they are daily presented.

3. A method for the feeding of pigs having a live weight of more than 75 kg. as in claim 1 comprising feeding the pigs during said daily feeding intervals a food mixture containing at least 15% protein content by weight.

4. A method for the feeding of pigs having a live weight of at least 5 kg. as in claim 1 comprising daily presenting no less than eight and no more than ten feeding intervals to the pigs, the sum of the daily feeding intervals not exceeding 18 minutes.

5. A method for the feeding of pigs as in claim 4 which comprises feeding the pigs during nine feeding intervals of 90 seconds each.

References Cited

UNITED STATES PATENTS

| | | | |
|---|---|---|---|
| 2,661,800 | 12/1953 | Reichenbach | 119—51 X |
| 2,881,733 | 4/1959 | Young et al. | 119—15 |
| 2,929,356 | 3/1960 | Bacigalupo | 119—51 |
| 3,112,731 | 12/1963 | Lako et al. | 119—51.12 |
| 3,124,104 | 3/1964 | Carpenter | 119—51.12 |
| 3,269,358 | 8/1966 | Hawley | 119—51.12 |

HUGH R. CHAMBLEE, *Primary Examiner.*